United States Patent
Chiu et al.

(10) Patent No.: US 11,568,382 B1
(45) Date of Patent: Jan. 31, 2023

(54) SYSTEM AND METHOD FOR PAYMENT TERMINAL OPTIMIZATION

(71) Applicant: Visa International Service Association, San Francisco, CA (US)

(72) Inventors: Kasey Chiu, Sunnyvale, CA (US); Kuen Mee Summers, Temecula, CA (US); Whitney Wilson Gonzalez, Brentwood, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 17/628,540

(22) PCT Filed: Jul. 28, 2021

(86) PCT No.: PCT/US2021/043353
§ 371 (c)(1),
(2) Date: Jan. 19, 2022

(51) Int. Cl.
*G06Q 20/32* (2012.01)
*G06Q 20/34* (2012.01)

(52) U.S. Cl.
CPC ....... *G06Q 20/3224* (2013.01); *G06Q 20/353* (2013.01); *G06Q 20/3278* (2013.01)

(58) Field of Classification Search
CPC .......... G06Q 20/3224; G06Q 20/3278; G06Q 20/353
USPC .......................................................... 705/41
See application file for complete search history.

(56) References Cited

U.S. PATENT DOCUMENTS 10,510,054 B1 * 12/2019 Eidam ................ G06Q 20/3276
11,321,709 B1 * 5/2022 Kolchin ............... G06Q 20/108

2009/0112766 A1   4/2009 Hammad et al.
2011/0057866 A1   3/2011 Konicek
2012/0318871 A1  12/2012 Mullen et al.
(Continued)

FOREIGN PATENT DOCUMENTS

CN    107133791 A    9/2017
CN    107924513 A    4/2018
(Continued)

OTHER PUBLICATIONS

"Security Analysis of Near-Field Communication (NFC) Payments," by Dennis Giese; Kevin Liu; Michael Sun; Tahin Syed; and Linda Zhang. May 16, 2018. (Year: 2018).*
(Continued)

*Primary Examiner* — Sara C Hamilton
(74) *Attorney, Agent, or Firm* — Buckley Patent Law LLC; Timothy E. Buckley

(57) ABSTRACT

A system includes a processor and a non-transitory computer readable medium coupled to the processor. The non-transitory computer readable medium includes code, that when executed by the processor, causes the processor to receive input from a user of a user device to generate an optimal payment location on an application display, generate a first boundary of the optimal payment location on the application display of the user device based upon a first motion of a payment enabled card in a first direction and generate a second boundary of the optimal payment location on the application display of the user device based upon a second motion of the payment enabled card in a second direction. The first boundary and the second boundary combine to form defining edges of the optimal payment location.

6 Claims, 6 Drawing Sheets

(56) References Cited

U.S. PATENT DOCUMENTS

| | | | |
|---|---|---|---|
| 2015/0294437 A1* | 10/2015 | Manno | G06Q 20/409 |
| | | | 382/182 |
| 2016/0019530 A1 | 1/2016 | Wang et al. | |
| 2016/0171361 A1* | 6/2016 | Chatterton | G06K 7/087 |
| | | | 705/41 |
| 2017/0220830 A1* | 8/2017 | Schmidt | G06Q 10/087 |
| 2018/0150831 A1* | 5/2018 | Dolan | G06Q 20/321 |
| 2020/0202313 A1* | 6/2020 | Eidam | A61B 5/117 |
| 2021/0067202 A1 | 3/2021 | Rule et al. | |
| 2021/0383390 A1* | 12/2021 | Gupta | G07F 7/0833 |
| 2022/0036336 A1* | 2/2022 | Goolkasian | H04L 67/34 |
| 2022/0076236 A1* | 3/2022 | Bodalia | G06K 7/1417 |

FOREIGN PATENT DOCUMENTS

| | | |
|---|---|---|
| TW | M509941 U | 10/2015 |
| WO | 2014037888 A1 | 3/2014 |

OTHER PUBLICATIONS

Whitney. "How to Set up and Use Google Pay." PCMag. Jan. 31, 2021 (Jan. 31, 2021) 1-20 Retrieved on Oct. 4, 2021 (Oct. 4, 2021) from https://www.pcmag.com/how-to/set-up-and-use-google-pay.

* cited by examiner

SYSTEM AND METHOD FOR PAYMENT TERMINAL OPTIMIZATION

CROSS-REFERENCE TO RELATED APPLICATION

This application claims priority to PCT International Application No. PCT/US2021/043353, filed Jul. 28, 2021, entitled "SYSTEM AND METHOD FOR PAYMENT TERMINAL OPTIMIZATION", which is hereby incorporated by reference in its entirety for all purposes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Traditional mobile devices are designed to operate primarily as communication devices and secondarily as payment terminals. Furthermore, because users of mobile devices prefer higher data transmission rates for high-quality video and internet applications, mobile devices generally are not suited to operate as payment terminals in a payment system. This is especially true for mobile devices that utilize near-field communication (NFC) systems, since NFC systems are generally designed to operate at lower transmission data rates and transmit data within a few centimeters. Therefore, a need exists to enable the development of mobile devices that operate effectively as payment terminals.

DETAILED DESCRIPTION

Figure 1A:
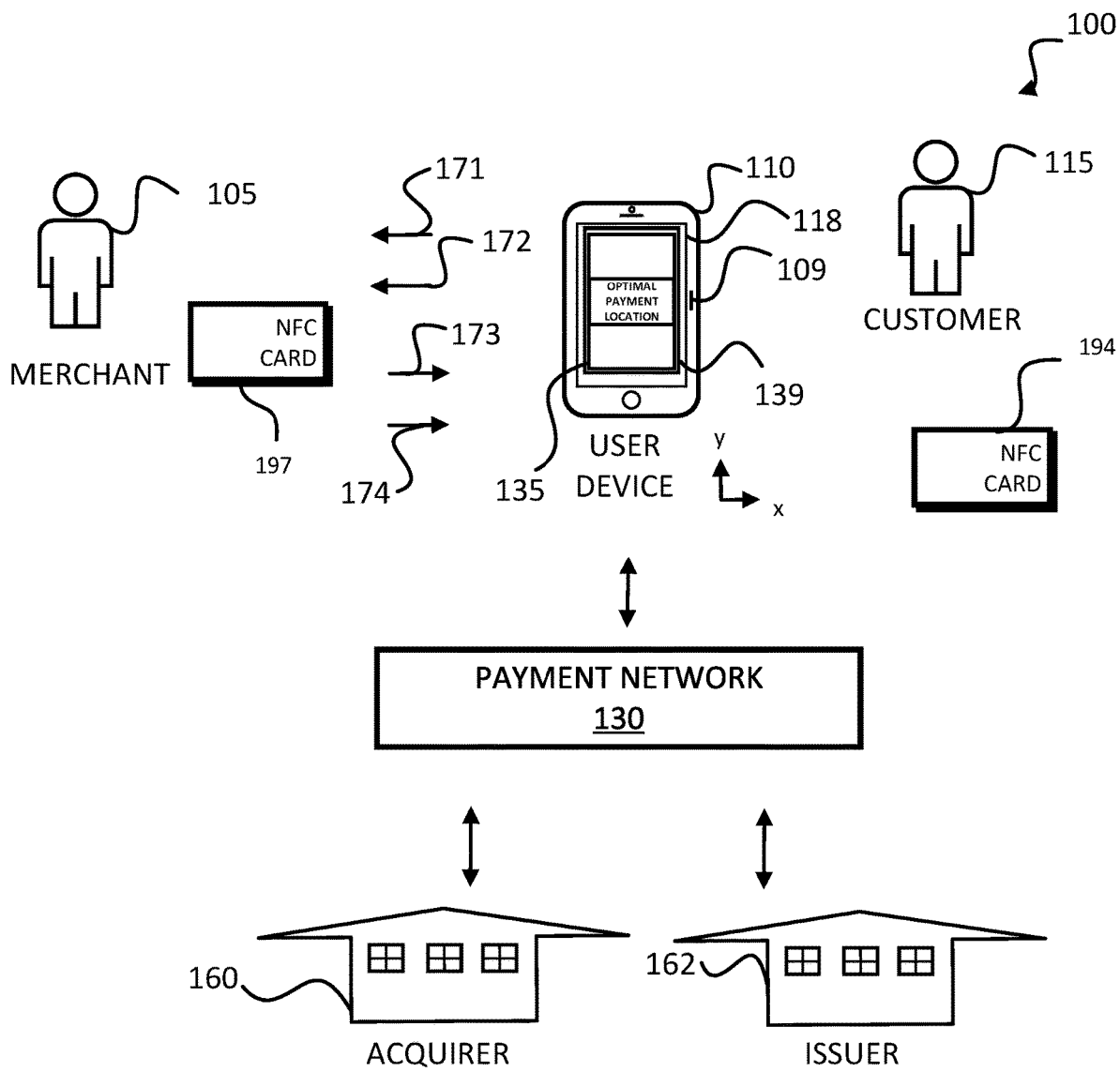
FIG. 1A is a block diagram illustrating a payment system in accordance with some embodiments.

FIGS. 1-5 illustrate systems and techniques that allow a user of a user device to optimize the user device as a payment terminal in a payment system. A payment terminal optimization application executed by the user device optimizes the user device by generating an optimal payment location on an application display of the user device. In some embodiments, in order to determine whether the payment terminal optimization application is capable of optimizing the user device as a payment terminal, the payment terminal optimization application performs a payment terminal verification of the user device. In some embodiments, during payment terminal verification, the payment terminal optimization application ascertains whether the user device is configured to operate as a payment terminal by assessing user device information associated with the user device. The user device information includes information related to whether the user device utilizes a payment-terminal-antenna configuration, such as, for example, a near-field communication (NFC) antenna. In some embodiments, when the payment terminal optimization application determines that the user device utilizes a payment-terminal-antenna configuration, the payment terminal optimization application proceeds to ascertain the optimal payment location on the application display of the user device.

In some embodiments, in order to ascertain the optimal payment location on the application display of the user device, the payment terminal optimization application requests that the user of the user device utilize a guide scan indicator, which may be, for example, a payment card image or a horizontal bar, located on the application display of the user device to guide a payment enabled card along a back side of the user device. In some embodiments, the payment enabled card is a contactless payment card, such as, for example, a credit card or debit card, that utilizes short range communication during the payment process, such as, for example, NFC. In some embodiments, the payment terminal optimization application scans the payment enabled card and determines a set of boundaries, e.g., a first boundary and a second boundary, of the optimal payment location on the application display of the user device. The payment terminal optimization application combines the set of boundaries to form the defining edges of the optimal payment location. Based on the scanning of the payment enabled card by the payment terminal optimization application, the payment terminal optimization application determines the optimal payment location on the application display of the user device. The payment terminal optimization process described herein improves upon existing user devices that operate as payment terminals by ascertaining the optimal placement location of the payment enabled card in order to improve upon the customer experience by reducing the amount of time it takes the customer to make a purchase of a product or service when tapping the user device.

As used herein, the term "account data," refers to any data concerning one or more accounts for one or more users. Account data may include, for example, one or more account identifiers, user identifiers, transaction histories, balances, credit limits, issuer institution identifiers, and/or the like. As used herein, the term "account identifier" may include one or more types of identifiers associated with a user account (e.g., a PAN, a primary account number, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a payment device (e.g., a portable payment instrument, a contactless payment enabled watch, a tablet, a phone, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the term "acquirer" or "acquirer institution" may refer to an entity licensed and/or approved by the transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments, an acquirer institution may be a financial institution, such as a bank. In some non-limiting embodiments, as used herein, the term "acquirer system" may refer to one or more computer systems, computer devices, software applications, and/or the like operated by or on behalf of an acquirer institution.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. It will be appreciated that numerous other arrangements are possible.

As used herein, the term "computing device", "communication device", or "user device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device or user device may include a cellular phone (e.g., a smartphone or standard cellular phone), a portable computer, a tablet, a wearable device (e.g., watches, glasses, lenses, clothing, and/or the like), a personal digital assistant (PDA), and/or other like devices. A computing device may also be a desktop computer or other form of non-mobile computer. As used herein, the term "user interface" or "graphical user interface" refers to a generated display, such as one or more graphical user interfaces (GUIs) with which a user may interact, either directly or indirectly (e.g., through a keyboard, mouse, touchscreen, etc.).

As used herein, the term "issuer institution" or "issuer host" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical financial instrument, e.g., a payment card, and/or may be electronic and used for electronic payments.

In some embodiments, the term "issuer system" refers to one or more computer systems operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. As used herein, the term "merchant system" may refer to one or more computer systems operated by or on behalf of a merchant, such as a server computer executing one or more software applications.

As used herein, the term "point-of-sale (POS) system," may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "payment device" may refer to a payment card (e.g., a credit or debit card), a gift card, a smartcard, smart media, a payroll card, a healthcare card, a wristband, a machine-readable medium containing account data, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of payment devices managed by a transaction service provider. As used herein, the term "payment gateway system" may refer to one or more computer systems, computer devices, servers, groups of servers, and/or the like operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

FIG. 1A illustrates a payment system 100 that supports payment terminal optimization of a user device 110 in accordance with some embodiments. In some embodiments, the payment system 100 may be, for example, a payment system that utilizes blockchain to store the financial transactions generated using the payment terminal optimization process described herein. In some embodiments, payment system 100 includes a payment network 130, an acquirer institution 160, an issuer institution 162, and a user device 110. In some embodiments, user device 110 is a computing device or a communication device that may be, for example, a mobile phone, tablet, computer, or the like. User 105 may be, for example, a merchant that utilizes user device 110 to implement the payment terminal optimization processes described herein. In some embodiments, user device 110 includes a display 118, a payment terminal optimization application (APP) 139, and an antenna configuration 109. In some embodiments, the display 118 may be a touch screen that supports various data input and output fields that are used by user 105 during the payment terminal optimization processes performed by payment terminal optimization App 139.

In some embodiments, antenna configuration 109 is a configuration of wireless communication antennas that are used for signal transmission and reception by user device 110. The antenna configuration 109 may be, for example, a payment-terminal-antenna configuration or a non-payment-terminal-antenna configuration. A non-payment-terminal-antenna configuration is, for example, an antenna system configured to perform standard wireless communication operations (e.g., video and audio transmission) for user device 110. In some embodiments, a payment-terminal-antenna configuration is an antenna system configured to operate as an antenna system for payment terminal operations, such as, for example, a near-field communication (NFC) antenna system. NFC is a set of communication protocols that enable electronic devices, at least one of which is typically a user device (e.g., a smartphone, etc.), to establish communication by bringing the electronic devices within an NFC range of each other (e.g., within 4 cm (1.6 in) of each other). In some embodiments, an NFC antenna configuration is an antenna configuration used by a computing device, such as, for example, user device 110, to operate using the NFC protocol.

In some embodiments, acquirer institution 160 is a financial institution that conducts payment transactions for user 105 using user device 110. For example, acquirer institution 160 is configured to accept payments from a customer of user 105 (e.g., user 115) using an optimal payment location generated on application display 135 by payment terminal optimization App 139 of user device 110. In some embodiments, issuer institution 162 is a financial institution associated with user 115 that allows user 115 to utilize user device 110 to transfer funds to a financial account associated with user 105. In some embodiments, payment network 130 is a transaction service provider (such as Visa® or any other entity that processes transactions) that receives transaction authorization requests from a merchant, such as, for example, user 105, using user device 110 and provides guarantees of payment of a monetary amount by, for example, issuer institution 162.

In some embodiments, payment terminal optimization APP 139 is a software application that is configured to execute the payment terminal optimization of application display 135 of user device 110. In some embodiments, payment terminal optimization is the process of optimizing application display 135 of user device 110 to operate as a payment terminal for payment transactions by generating an optimal payment location on application display 135. In some embodiments, the optimal payment location is a boundary defined location on application display 135 that is used by a customer of user 105, such as, for example, user 115, to make a purchase of a product or service using a payment enabled device, such as, for example, payment enabled card 194.

In some embodiments, during payment terminal optimization, the optimal payment location on application display 135 is generated by payment terminal optimization App 139 using antenna configuration 109. In some embodiments, antenna configuration 109 of user device 110 is configured to scan payment enabled card 197 to find a set of boundaries that combine to form the defining edges of the optimal payment location. For example, payment terminal optimization App 139 utilizes antenna configuration 109 of user device 110 to scan payment enabled card 197 to find a first boundary and a second boundary (depicted and described further with reference to FIG. 2A-FIG. 2F) of the optimal payment location. In some embodiments, at least two of the boundaries, such as, for example, the first boundary and the second boundary combine to form the defining edges of the optimal payment location on application display 135. In some embodiments, additional boundaries may be generated by the payment terminal optimization App 139 depending on, for example, the shape (e.g., rectangular, square, etc.) of the optimal payment location. For example, the set of boundaries may include a first boundary, a second boundary, a third boundary, and a fourth boundary, etc. In some embodiments, the optimal payment location generated by payment terminal optimization App 139 improves upon existing payment terminal applications by reducing the number of instances required by a customer of user 105 to tap the payment enabled device against, near, or behind the optimal payment location presented on application display 135 to make a purchase, thereby improving customer experience.

Figure 1B:
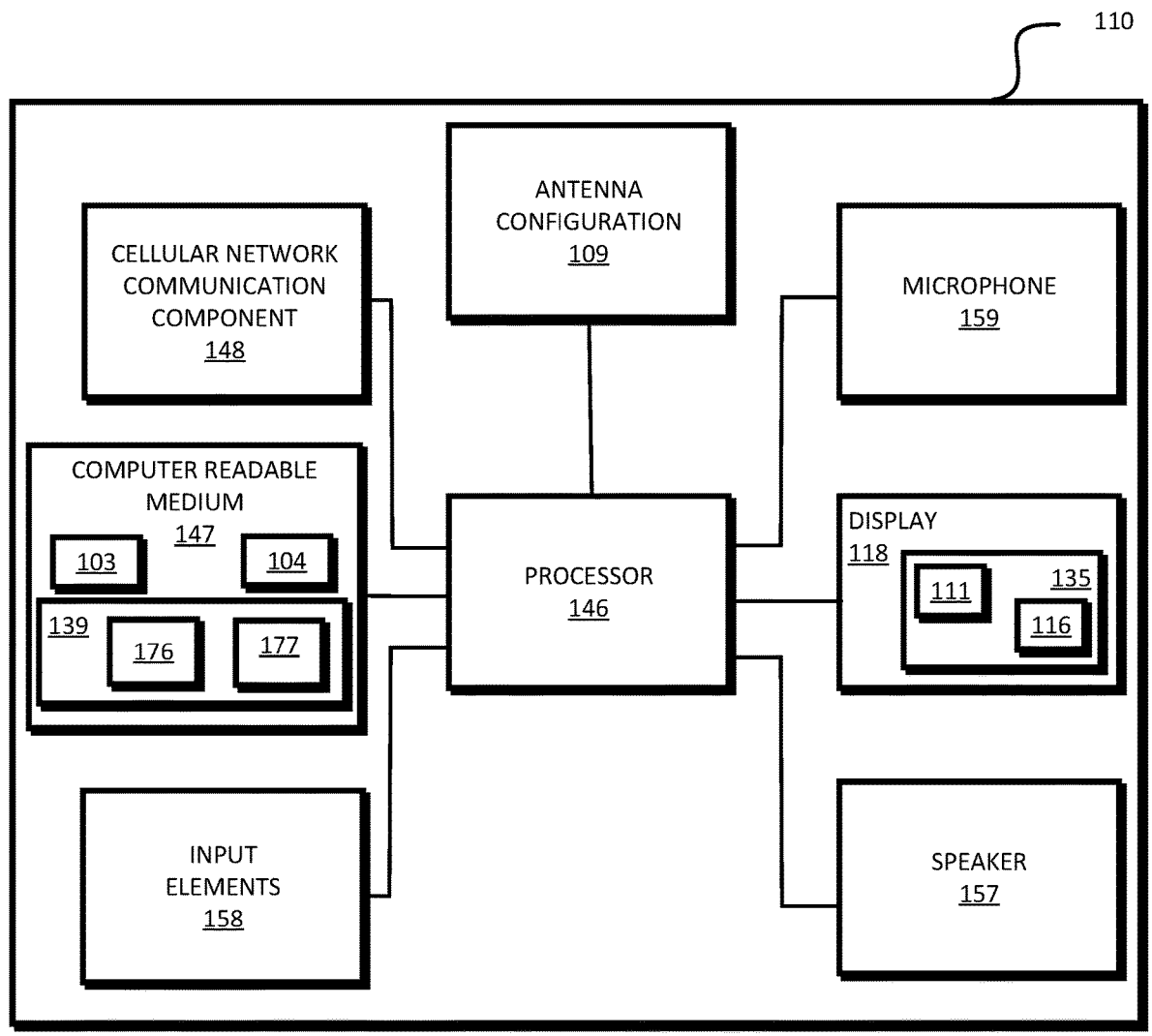
FIG. 1B is a block diagram illustrating a user device of FIG. 1 in accordance with some embodiments.

FIG. 1B illustrates a block diagram of user device 110 of FIG. 1A in accordance with some embodiments. In some embodiments, user device 110 includes a computer readable medium 147, a cellular network communication component 148, an antenna configuration 109, and a processor 146. In some embodiments, the computer readable medium 147 may be present within the user device 110 or may be detachable from user device 110. In some embodiments, the cellular network communication component 148 may act as a communication interface to receive cellular network communications using the user device 110. In some embodiments, the computer readable medium 147 may be in the form of (or may be included in) a memory that stores data (e.g., issuer account numbers and other elements of payment data) and may be in any suitable form including a memory chip, etc. In some embodiments, computer readable medium 147 stores information such as, for example, applications which control the communication with the service provider and other functions within the device. In some embodiments, device memory may store financial or payment information which may include information such as bank account information, a bank identification number (BIN), credit or debit card number information, account balance information, expiration date, consumer information such as name, date of birth, etc. In some embodiments, device memory may store user device information which may include information such as a user device brand, a user device model name, a user device model number, a user device encryption type, a user device antenna configuration, and a user device operating system (OS), etc. In some embodiments, any of this information can be transmitted by user device 110.

In some embodiments, user device 110 may also include the processor 146 (e.g., a microprocessor) for processing the functions and applications of user device 110. In some embodiments, user device 110 may also include the display 118 to allow a user to interact with payment terminal optimization App 139. In some embodiments, user device 110 may further include input elements 158 to allow a user to input information into the user device 110, a speaker 157 to allow a user to hear voice communication, music, etc., and a microphone 159 to allow the user to interact with the payment terminal optimization App 139, by transmitting the user's voice through the user device 110. In some embodiments, user device 110 includes the microphone 159 to allow the user to interact with the payment terminal optimization App 139 to, for example, allow user 105 to verbally control the speed at which the guide scan indicator (discussed further in detail below) guides payment enabled card 197.

With reference to FIG. 1B and FIG. 1A, in some embodiments, in order to initiate the payment terminal optimization of application display 135, payment terminal optimization App 139 is configured to perform a payment terminal verification and a payment terminal optimization of user device 110. Payment terminal verification is the process of verifying that user device 110 is configured to operate as a payment terminal for receipt of payment using a payment enabled device, such as, for example, payment enabled card 197. In some embodiments, user device 110 includes a payment terminal verification unit 176 configured to perform the payment terminal verification of user device 110 and a payment terminal optimization unit 177 configured to perform the payment terminal optimization of user device 110. In some embodiments, computer readable medium 147 of user device 110 includes the payment terminal verification unit 176 configured to perform the payment terminal verification of user device 110 and the payment terminal optimization unit 177 configured to perform the payment terminal optimization of user device 110. In some embodiments, payment terminal optimization App 139 of user device 110 includes the payment terminal verification unit 176 and/or the payment terminal optimization unit 177. In some embodiments, payment terminal verification unit 176 is software and/or electronic hardware components that are configured to perform the payment terminal verification of user device 110 by verifying user device 110 is operable as a payment terminal. In some embodiments, payment terminal optimization unit 177 is software and/or electronic hardware components that are configured to perform the payment terminal optimization of user device 110 by determining the optimal payment location on application display 135 to tap a payment enabled card 197 (discussed further below with respect to FIGS. 1-5).

In some embodiments, in operation, user 105 initiates the payment terminal optimization process by selecting the payment terminal optimization App 139 on user device 110. In some embodiments, upon selection of payment terminal optimization App 139, payment terminal verification unit 176 commences the process of performing the payment terminal verification of user device 110. In some embodiments, in order to conduct the payment terminal verification of user device 110, payment terminal verification unit 176 performs a user device information assessment of user device 110. In some embodiments, user device information is device specific information associated with the software and hardware configuration of user device 110. For example, user device information includes a user device brand, a user device model name, a user device model number, a user device encryption type, a user device antenna configuration, and a user device operating system (OS). In some embodiments, payment terminal verification unit 176 collects user device information from user device 110 and stores the user device information as user device information 103. In some embodiments, the user device information 103 collected by payment terminal optimization App 139 is stored in a table or data structure in computer readable medium 147 for use by payment terminal optimization App 139 during the payment terminal optimization process. User device information 103 may be stored locally on, for example, user device 110, or remotely on, for example, a server associated with payment terminal optimization App 139.

In some embodiments, payment terminal verification unit 176 of payment terminal optimization App 139 ascertains user device information from user device 110 by accessing a settings menu 104 of the user device 110. As stated previously, the user device information accessed by the payment terminal verification unit 176 in the settings menu 104 of user device 110 includes, for example, the user device 110 brand, the user device 110 model name, the user device 110 model number, the user device 110 encryption type, the user device 110 antenna configuration, and the user device 110 operating system (OS). In some embodiments, payment terminal verification unit 176 verifies the functionality of user device 110 as a payment terminal by assessing the antenna configuration 109 of user device 110 stored in user device information 103.

In some embodiments, after payment terminal optimization App 139 ascertains the user device information 103 from user device 110, payment terminal optimization App 139 confirms the user device information 103 is correct information by either utilizing the payment terminal verification unit 176 to confirm the user device information 103 or having user 105 confirm the user device information 103. In some embodiments, when payment terminal optimization App 139 utilizes user 105 to confirm the user device information 103, payment terminal optimization App 139 displays a first subset of the user device information 103 on application display 135 for confirmation by user 105. In some embodiments, the first subset of user device information 103 includes, for example, the user device brand, the user device model name, the user device antenna configuration, and the user device operating system. In some embodiments, upon display of the first subset of the user device information 103, payment terminal optimization App 139 requests user 105 confirm the first subset of the user device information 103 by displaying a confirmation button, a non-confirmation button, and a confirmation statement in the application display 135. In some embodiments, the confirmation statement displayed on payment terminal optimization App 139 is a statement that requests user 105 confirm the user device information 103 displayed on the application display 135. In some embodiments, user 105 views the confirmation statement, the confirmation button, and the non-confirmation button and either confirms the first subset of the user device information 103 by selecting the confirmation button or does not confirm the first subset of the user device information 103 by selecting the non-confirmation button.

In some embodiments, when user 105 selects the non-confirmation button and does not confirm the first subset of the user device information 103, payment terminal optimization App 139 exits the payment terminal verification process and closes the payment terminal optimization App 139. In some embodiments, when user 105 selects the confirmation button and confirms the first subset of user device information 103, payment terminal verification unit 176 of payment terminal optimization App 139 continues with the payment terminal verification process by determining whether the antenna configuration 109 of user device 110 is an antenna configuration that may be used as a payment-terminal-antenna configuration during the payment terminal optimization process.

In some embodiments, as an alternative to user 105 confirming user device information 103, payment terminal optimization App 139 utilizes payment terminal verification unit 176 to confirm the correctness of user device information 103. In some embodiments, payment terminal verification unit 176 confirms the user device information 103 by comparing the user device information 103 to a predefined user device information set stored by payment terminal optimization App 139 in computer readable medium 147 for specific models of user devices. For example, for a specific user device 110, the predefined user device set includes the user device brand, the user device model name, the user device model number, the user device encryption type, the user device antenna configuration, and the user device OS. In some embodiments, when the payment terminal verification unit 176 determines that the collected user device information 103 does not map to a predefined user device information set, the user device information 103 for user device 110 is considered not correct and payment terminal optimization App 139 exits the payment terminal verification process and closes the payment terminal optimization App 139. In some embodiments, when the payment terminal verification unit 176 compares the user device information 103 to the predefined user device information set and determines that the collected user device information 103 matches the predefined user device information set, the user device information 103 for user device 110 is considered correct and payment terminal optimization App 139 continues with the payment terminal verification process.

In some embodiments, when payment terminal verification unit 176 confirms the user device information 103 is correct, payment terminal verification unit 176 continues with the payment terminal verification process by determining whether the antenna configuration 109 is a payment-terminal-antenna configuration that may be used for payment terminal optimization. In some embodiments, payment terminal verification unit 176 of payment terminal optimization App 139 determines whether the antenna configuration 109 is a payment-terminal-antenna configuration by comparing the user device antenna configuration specified in user device information 103 to a known payment-terminal-antenna configuration, such as, for example, an NFC antenna configuration. In some embodiments, when payment terminal verification unit 176 determines that the antenna configuration for user device 110 does not map to a known payment-terminal antenna configuration, payment terminal verification unit 176 displays a non-payment-terminal antenna configuration statement to user 105 on application display 135. In some embodiments, the non-payment-terminal antenna configuration statement displayed to user 105 on application display 135 is a statement that notifies user 105 that the user device 110 is not configured to operate as a payment terminal. In some embodiments, after displaying the non-payment-terminal antenna configuration statement to user 105, payment terminal verification unit 176 exits the payment terminal verification process and closes the payment terminal optimization App 139. In some embodiments, when payment terminal verification unit 176 determines that user device 110 maps to a known payment-terminal antenna configuration, user device 110 is considered verified as a payment-terminal and payment terminal optimization unit 177 proceeds with determining the optimal payment location on application display 135 of user device 110.

In some embodiments, in order to determine the optimal payment location on application display 135 of user device 110, payment terminal optimization unit 177 requests consent from user 105 to access antenna configuration 109 of user device 110. In some embodiments, requesting consent to access antenna configuration 109 allows payment terminal optimization unit 177 to use antenna configuration 109 of user device 110 to scan payment enabled card 197 to determine the optimal payment location of application display 135. In some embodiments, payment terminal optimization unit 177 requests consent from user 105 to access to antenna configuration 109 by displaying an antenna request consent prompt, a consent button, and a non-consent button on the application display 135. In some embodiments, the antenna request consent prompt displayed by payment terminal optimization App 139 on application display 135 is a statement that requests user 105 consent or not consent to the use of antenna configuration 109 to determine the optimal payment location on application display 135. In some embodiments, the consent button and the non-consent button generated on application display 135 are configured to allow or not allow payment terminal optimization App 139 to access the antenna configuration 109 of user device 110. In some embodiments, user 105 views the consent button and the non-consent button and either consents to the use of the antenna configuration 109 by selecting the consent button or does not consent to the use of the antenna configuration 109 by selecting the non-consent button.

In some embodiments, when user 105 selects the non-consent button and does not consent to the use of antenna configuration 109 by payment terminal optimization App 139, payment terminal optimization App 139 exits the payment terminal optimization process and closes the payment terminal optimization App 139. In some embodiments, instead of closing the payment terminal optimization App 139, payment terminal optimization App 139 presents a message to user 105 requesting user 105 access the settings menu 104 to adjust a consent configuration setting in setting menu 104 to proceed with the payment terminal optimization process. In some embodiments, when user 105 selects the consent button, payment terminal optimization unit 177 continues with the payment optimization process by determining an optimal payment location 116 on application display 135.

Determination of an Optimal Payment Location Using a Guide Scan Indicator

In some embodiments, with further reference to FIG. 1B, in order to determine an optimal payment location 116 on application display 135, payment terminal optimization App 139 requests that user 105 scan payment enabled card 197 along user device 110 according to the positioning of a guide scan indicator 111 (described in detail below with reference to FIG. 2A-FIG. 2F) generated by payment terminal optimization unit 177 on application display 135. In some embodiments, the guide scan indicator 111 is a payment card image or a horizontal bar generated on application display 135 that is configured to guide user 105 in scanning payment enabled card 197 along a first side (e.g., a "back side") of user device 110. In some embodiments, with reference to a horizontal/vertical or x-y coordinate system depicted in FIG. 1A, the scanning of payment enabled card 197 to generate the optimal payment location 116 includes a first scan of the payment enabled card 197 in a first direction along the first side of user device 110 and a second scan of the payment enabled card 197 in a second direction along the first side of user device 110.

Guide Scan Indicator Movement

In some embodiments, with reference to the movement of the guide scan indicator 111 during the first scan of payment enabled card 197, the payment terminal optimization unit 177 moves the guide scan indicator 111 in the first direction (e.g., a first vertical direction in the positive y-direction) from a first guide scan indicator position on application display 135 to a second guide scan indicator position on application display 135 of user device 110. In some embodiments, during the second scan of payment enabled card 197, the payment terminal optimization unit 177 moves the guide scan indicator 111 in the second direction (e.g., a second vertical direction in the negative y-direction) from a third guide scan indicator position on application display 135 to a fourth guide scan indicator position on application display 135. In some embodiments, payment terminal optimization unit 177 moves the guide scan indicator 111 at a pace that allows user 105 to move the payment enabled card 197 along the first side of user device 110 such that antenna configuration 109 is able to scan the payment enabled card 197.

Using Payment Enabled Device to Determine the Boundaries of the Optimal Payment Location In some embodiments, payment terminal optimization unit 177 senses the payment enabled card 197 to determine the set of boundaries of the optimal payment location 116 on application display 135. In some embodiments, payment terminal optimization unit 177 senses the payment enabled card 197 by receiving response signals (e.g., a first response signal 173 and a second response signal 174) ascertained during the scanning of the payment enabled card 197. In some embodiments, the response signals are used by payment terminal optimization unit 177 to determine the set of boundaries of the optimal payment location 116 on application display 135. For example, payment terminal optimization unit 177 uses the first response signal 173 from payment enabled card 197 to determine the first boundary of the optimal payment location 116 during the first scan of the payment enabled card 197 and the second response signal 174 to determine the second boundary of the optimal payment location 116 during the second scan of the payment enabled card 197. In some embodiments, payment terminal optimization unit 177 uses the first boundary and the second boundary to form the defining edges of the optimal payment location 116 used by user 115 to pay for products from user 105 using user device 110.

Scanning and Positioning of the Payment Enabled Card

In some embodiments, with reference to the scanning and positioning of the payment enabled card 197 along the "back side" of user device 110 (described further in detail below with reference to FIG. 2A-FIG. 2F)), the first scan of the payment enabled card 197 refers to a scan of the payment enabled card 197 in the first direction using the guide scan indicator 111 as a guide. In some embodiments, guide scan indicator 111 guides payment enable card 197 from a first back side scan position 271 on user device 110 to a second back side scan position 272 on user device 110. In some embodiments, the first back side scan position 271 corresponds to the first guide scan indicator position located on the application display 135 of user device 110 and the second back side scan position 272 corresponds to the second guide scan indicator position located on the application display 135 of user device 110.

In some embodiments, the second scan of the payment enabled card 197 refers to a scan of the payment enabled card 197 in the second direction using the guide scan indicator 111 as a guide. In some embodiments, guide scan indicator 111 guides payment enable card 197 from a third back side scan position on user device 110 to a fourth back side scan position. In some embodiments, the third back side scan position corresponds to the third guide scan indicator position located on the application display 135 on user device 110 and the fourth back side scan position corresponds to the fourth guide scan indicator position located on the application display 135 on user device 110. In some embodiments, each of the back side scan positions described herein map to corresponding guide scan indicator positions on application display 135.

First Boundary Determination of the Optimal Payment Location

In some embodiments, in order to determine the first boundary of the optimal payment location 116, user 105 is prompted to guide the payment enabled card 197 along the back side of user device 110 according to the positioning of the guide scan indicator 111. In some embodiments, payment terminal optimization unit 177 moves the guide scan indicator 111 in the first direction from the first guide scan indicator position of application display 135 to the second guide scan indicator position of application display 135. In some embodiments, concurrently, while the guide scan indicator 111 is in motion, user 105 moves the payment enabled card 197 along the first side of user device 110 according to the movement of the guide scan indicator 111 on application display 135.

In some embodiments, while user 105 is moving the payment enabled card 197 along the first side of user device 110 in the first direction, payment terminal optimization unit 177 determines the first boundary of the optimal payment location 116 of application display 135. In some embodiments, payment terminal optimization unit 177 of payment terminal optimization App 139 determines the first boundary of the optimal payment location 116 by tracking a first location (described further in detail below with reference to FIG. 2A-FIG. 2F) at which antenna configuration 109 senses payment enabled card 197 in the first direction.

In some embodiments, when the antenna configuration 109 tracks or identifies the first location at which antenna configuration 109 has sensed the payment enabled card 197, the first location is cross-referenced by payment terminal optimization unit 177 to the corresponding location of the guide scan indicator 111 on application display 135. In some embodiments, the corresponding location of the guide scan indicator 111 on application display 135 is designated by the payment terminal optimization unit 177 as the first boundary of the optimal payment location 116. Thus, in some embodiments, moving the guide scan indicator 111 and the payment enabled card 197 in tandem in the first direction along the user device 110 allows payment terminal optimization unit 177 to obtain the first boundary of the optimal payment location 116.

Second Boundary Determination of the Optimal Payment Location

In some embodiments, in order to determine the second boundary of the optimal payment location 116, payment terminal optimization unit 177 moves the guide scan indicator 111 in the second direction from the third guide scan indicator position of application display 135 to the fourth guide scan indicator position of application display 135. In some embodiments, concurrently, user 105 continues to move the payment enabled card 197 along the first side of user device 110 according to the movement of the guide scan indicator 111 on application display 135. In some embodiments, payment terminal optimization unit 177 of payment terminal optimization App 139 determines the second boundary of the optimal payment location 116 by tracking a second location at which antenna configuration 109 senses payment enabled card 197 in the second direction.

In some embodiments, when the antenna configuration 109 tracks or identifies the second location at which antenna configuration 109 has sensed the payment enabled card 197, the second location is cross-referenced by payment terminal optimization unit 177 to the corresponding location of the guide scan indicator 111 on application display 135. In some embodiments, the corresponding location of the guide scan indicator on application display 135 is designated by the payment terminal optimization unit 177 as the second boundary of the optimal payment location 116. Thus, in some embodiments, moving the guide scan indicator 111 and the payment enabled card 197 in tandem in the second direction along the user device 110 allows payment terminal optimization unit 177 to obtain the second boundary of the optimal payment location 116.

In some embodiments, after attaining the first boundary during the first scan of the payment enabled card 197 and the second boundary during the second scan of the payment enabled card 197, payment terminal optimization unit 177 combines the first boundary and the second boundary to form the defining edges of the optimal payment location 116.

User 115 may then utilize the optimal payment location 116 to pay for products or services provided by user 105 using user device 110. In some embodiments, prior to user 115 utilizing the optimal payment location 116 to pay for products or services, user 105 may test the optimal payment location 116 in order to generate a visual, such as, for example, an optimal payment location image, to present to user 115. In some embodiments, the optimal payment location image indicates to user 115 the optimal payment location 116 on application display 135 to tap payment enabled card 194. In some embodiments, user 105 may adjust the location of the defined boundaries of the optimal payment location 116 using payment terminal optimization App 139. In some embodiments, with the knowledge of the optimal payment location 116, user 105 is able to advise a user 115 of the location on user device 110 to tap payment enabled card 194 for payment. In some embodiments, payment terminal optimization unit 177 provides the optimal payment location 116 to a point-of-sale application of user 105 in order to, for example, overlay a visual guide on the application display 135. In some embodiments, the visual guide assists user 105 in advising user 115 of the location on application display 135 to tap a payment enabled card 194 for payment. The generation of the optimal payment location 116 on application display 135 by payment terminal optimization App 139 improves upon existing payment terminals by reducing the amount of time required by the customer of user 105 to make a purchase using user device 110.

FIG. 2A-FIG. 2F illustrate various stages of the process of determining an optimal payment location 216 on application display 135 of user device 110. FIGS. 2A-2F depict a first side 262 of user device 110 illustrating a "back perspective" or a "back side" of user device 110 and a second side 261 illustrating a "front perspective" or a "front side" of user device 110. In some embodiments, application display 135 of second side 261 is partitioned by payment terminal optimization unit 177 into a first partition 231-1, a second partition 231-2, and a third partition 231-3. In some embodiments, first partition 231-1, second partition 231-2, and third partition 231-3 are pre-determined by the payment terminal optimization unit 177 to be of equal width and length to allow for the positioning of the guide scan indicator 211 on the second side 261 and the payment enabled card 197 on the first side 262. In some embodiments, first partition 231-1, second partition 231-2, and third partition 231-3 may vary in size depending on, for example, the size or location of the payment enabled device being scanned by antenna configuration 109.

Figure 2A:
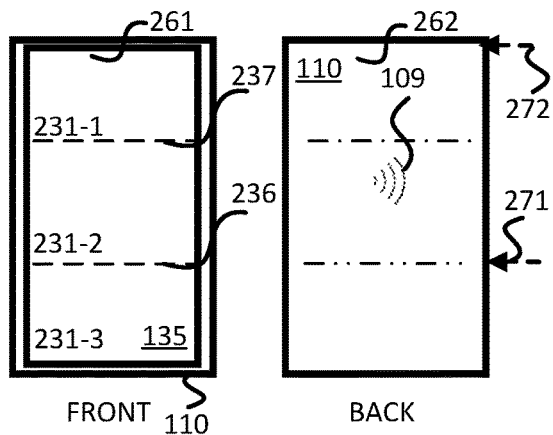
FIGS. 2A-2F illustrate a user device associated with the payment system in FIG. 1 in various stages of performing payment terminal optimization in accordance with some embodiments.
Figure 2D:
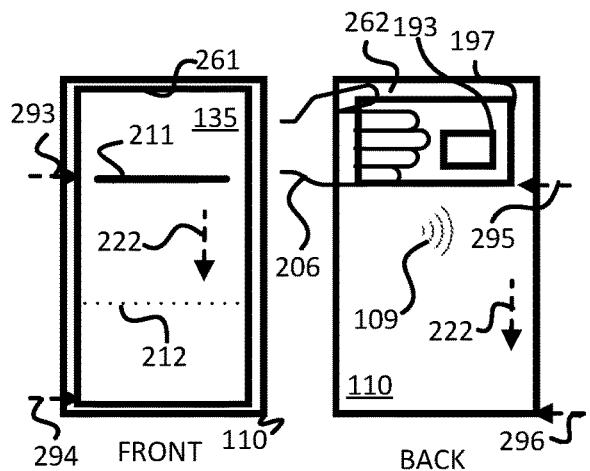
Figure 2B:
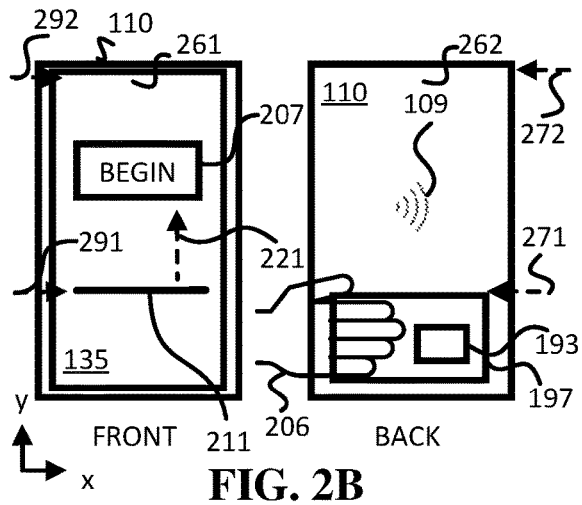

In FIG. 2B, at the commencement of the payment optimization process, payment terminal optimization App 139 displays a begin button 207 and a guide scan indicator 211 on application display 135 of user device 110. In some embodiments, as stated previously, guide scan indicator 211 is configured to guide user 105 in scanning payment enabled card 197 along the first side 262 of user device 110. In some embodiments, the guide scan indicator 211 is placed by payment terminal optimization unit 177 at a first guide scan indicator position 291 on application display 135. In some embodiments, the first guide scan indicator position 291 is placed at a guide scan indicator position located in the third partition 231-3 of application display 135. In some embodiments, the first guide scan indicator position 291 is placed at a top position 236 in the third partition 231-3 of application display 135. In alternate embodiments, guide scan indicator 211 may be placed at other positions on application display 135 that allow payment terminal optimization unit 177 to generate the optimal payment location 216.

In some embodiments, as depicted in the back perspective of FIG. 2B, user 105, using hand 206, places a payment enabled card 197 at a first back side scan position 271 of first side 262 that maps to the position of the guide scan indicator 211 located on application display 135. In some embodiments, upon selection of begin button 207 by user 105, payment terminal optimization unit 177 moves guide scan indicator 211 in a first direction 221 from a first guide scan indicator position 291 to a second guide scan indicator position 292 on application display 135. In some embodiments, a countdown timer may be generated by payment terminal optimization unit 177 on application display 135. In some embodiments, after the begin button 207 is pressed by user 105, the countdown timer is displayed on application display 135 for view by user 105. In some embodiments, the countdown timer displayed on application display 135 provides user 105 with a pre-determined amount of time to position the payment enabled card 197 in the location indicated by the guide scan indicator 211 prior to scanning the payment enabled card 197.

In some embodiments, as stated previously, payment terminal optimization unit 177 moves guide scan indicator 211 at a pace that allows user 105 to move the payment enabled card 197 along the first side 262 such that payment terminal optimization unit 177 is able to utilize antenna configuration 109 to scan the payment enabled card 197. In some embodiments, payment terminal optimization unit 177 uses the antenna configuration 109 to sense payment enabled card 197 to determine the optimal payment location 216. In some embodiments, payment terminal optimization unit 177 senses the payment enabled card 197 by transmitting a scan signal to payment enabled card 197 and receiving a response signal from the payment enabled card 197 that indicates the location of the payment enabled card 197.

Figure 2E:
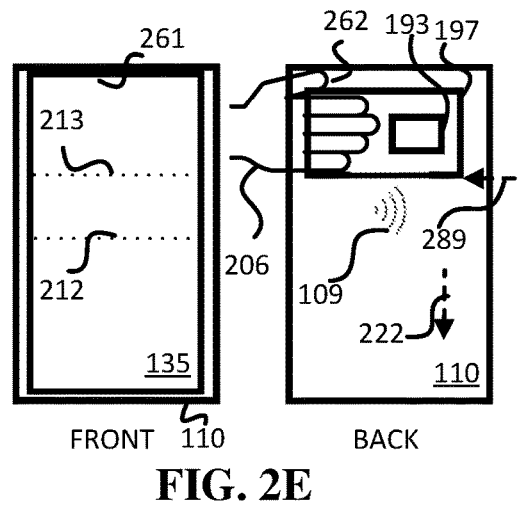
Figure 2C:
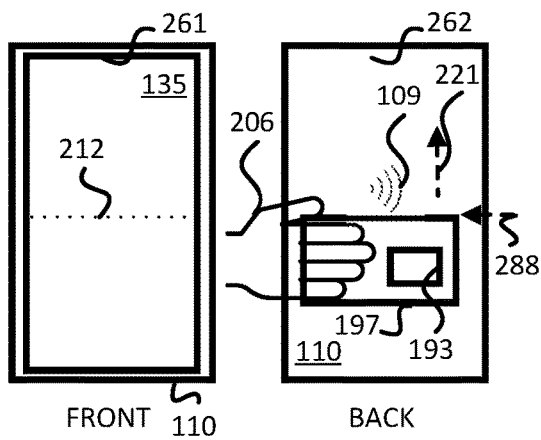

In FIG. 2C, user 105 moves payment enabled card 197 in the first direction 221 along the first side 262 using guide scan indicator 211 on application display 135 as a guide. In some embodiments, while user 105 is moving the payment enabled card 197 along the first side 262 of the user device 110, payment terminal optimization unit 177 utilizes antenna configuration 109 to scan the payment enabled card 197 by transmitting a first scan signal 171 to payment enabled card 197. In some embodiments, payment enabled card 197 receives the first scan signal 171 and in response, transmits a first response signal 173 to payment terminal optimization unit 177. In some embodiments, payment terminal optimization unit 177 receives the first response signal 173 from payment enabled card 197 and uses the first response signal to determine a first boundary 212 of the optimal payment location 216. In some embodiments, payment terminal optimization unit 177 determines the first boundary 212 by tracking a first location 288 on first side 262 at which antenna configuration 109 senses the received first response signal 173 from the payment enabled card 197 during the scan in the first direction 221. In some embodiments, when the antenna configuration 109 senses the received first response signal 173 at the first location 288, payment terminal optimization unit 177 cross-references the first location 288 to a corresponding first location of the guide scan indicator 211 on application display 135. In some embodiments, the corresponding first location of the guide scan indicator 211 that maps to the first location 288 is the first boundary 212 of the optimal payment location on application display 135. In some embodiments, payment terminal optimization unit 177 stores the first location 288 and the corresponding first location of the guide scan indicator (e.g., the first boundary 212) for use in determining the optimal payment location 216. In some embodiments, after determining the first boundary 212 of the optimal payment location 216, payment terminal optimization unit 177 proceeds to determine a second boundary 213 of the optimal payment location 216.

In FIG. 2D, the guide scan indicator 211 is placed by payment terminal optimization unit 177 at a third guide scan indicator position 293 on application display 135. In some embodiments, the third guide scan indicator position 293 is located at a guide scan indicator position in the first partition 231-1 of application display 135. In some embodiments, the third guide scan indicator position 293 is located at a bottom position 237 of the first partition 231-1 of application display 135. In some embodiments, payment terminal optimization unit 177 moves guide scan indicator 211 in the second direction 222 from the third guide scan indicator position 293 to a fourth guide scan indicator position 294 on application display 135. User 105, using hand 206, continues to guide payment enabled card 197 according to the positioning of the guide scan indicator 211 (e.g., third guide scan indicator position 293) located on application display 135.

In FIG. 2E, user 105 moves payment enabled card 197 in the second direction 222 along the first side 262 of user device 110 using guide scan indicator 211 as a guide, e.g., from the third back side scan position 295 towards the fourth back side scan position 296. In some embodiments, while user 105 is moving the payment enabled card 197 in the second direction 222 along the first side 262 of the user device 110, payment terminal optimization unit 177 utilizes antenna configuration 109 to scan the payment enabled card 197 by transmitting a second scan signal 172 to sense payment enabled card 197. In some embodiments, payment enabled card 197 receives the second scan signal 172 and in response, transmits a second response signal 174 to payment terminal optimization unit 177. In some embodiments, payment terminal optimization unit 177 receives the second response signal 174 from payment enabled card 197 and uses the second response signal 174 to determine a second boundary 213 of the optimal payment location 216. In some embodiments, payment terminal optimization unit 177 determines the second boundary 213 by tracking a second location 289 on first side 262 at which antenna configuration 109 senses the second response signal 174 from payment enabled card 197 during the scan in the second direction 222. In some embodiments, when the antenna configuration 109 senses the payment enabled card 197 at the second location 289, payment terminal optimization unit 177 cross-references the second location 289 to a corresponding second location of the guide scan indicator 211 on application display 135. In some embodiments, the corresponding second location of the guide scan indicator 211 that maps to the second location 289 is the second boundary 213 of the optimal payment location on application display 135. In some embodiments, payment terminal optimization unit 177 stores the second location 289 and the corresponding second location of the guide scan indicator (e.g., the second boundary 213) for use in determining the optimal payment location 216. Thus, in some embodiments, based on an assessment of the second response signal 174 received from the payment enabled card 197 during the scanning process in the second direction 222, payment terminal optimization App 139 is able generate the second boundary 213 of the optimal payment location 216.

Figure 2F:
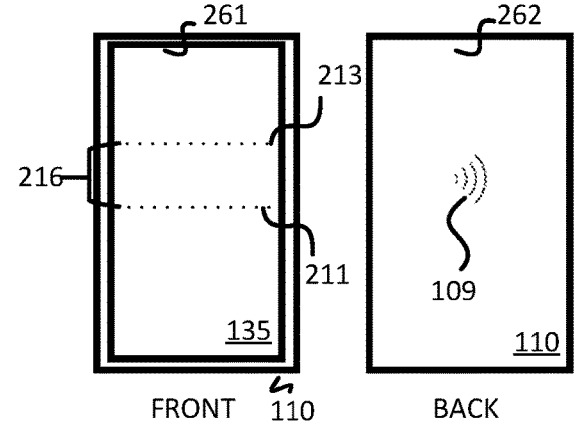

In FIG. 2F, in some embodiments, after ascertaining the first boundary 212 and the second boundary 213, payment terminal optimization unit 177 generates the optimal payment location 216 by combining the first boundary 212 and the second boundary 213 to form the defining edges of the optimal payment location 216. In some embodiments, payment terminal optimization unit 177 subsequently displays the optimal payment location 216 to user 105 of user device 110. In some embodiments, payment terminal optimization unit 177 displays the optimal payment location 216 on application display 135 for use by a customer of user 105 to make a purchase of a product or service using a payment enabled card 194. In some embodiments, an alternate software application may be used to display the optimal payment location 216 on application display 135 for use by a customer of user 105 to make a purchase of a product or service using a payment enabled card 194.

Figure 3:
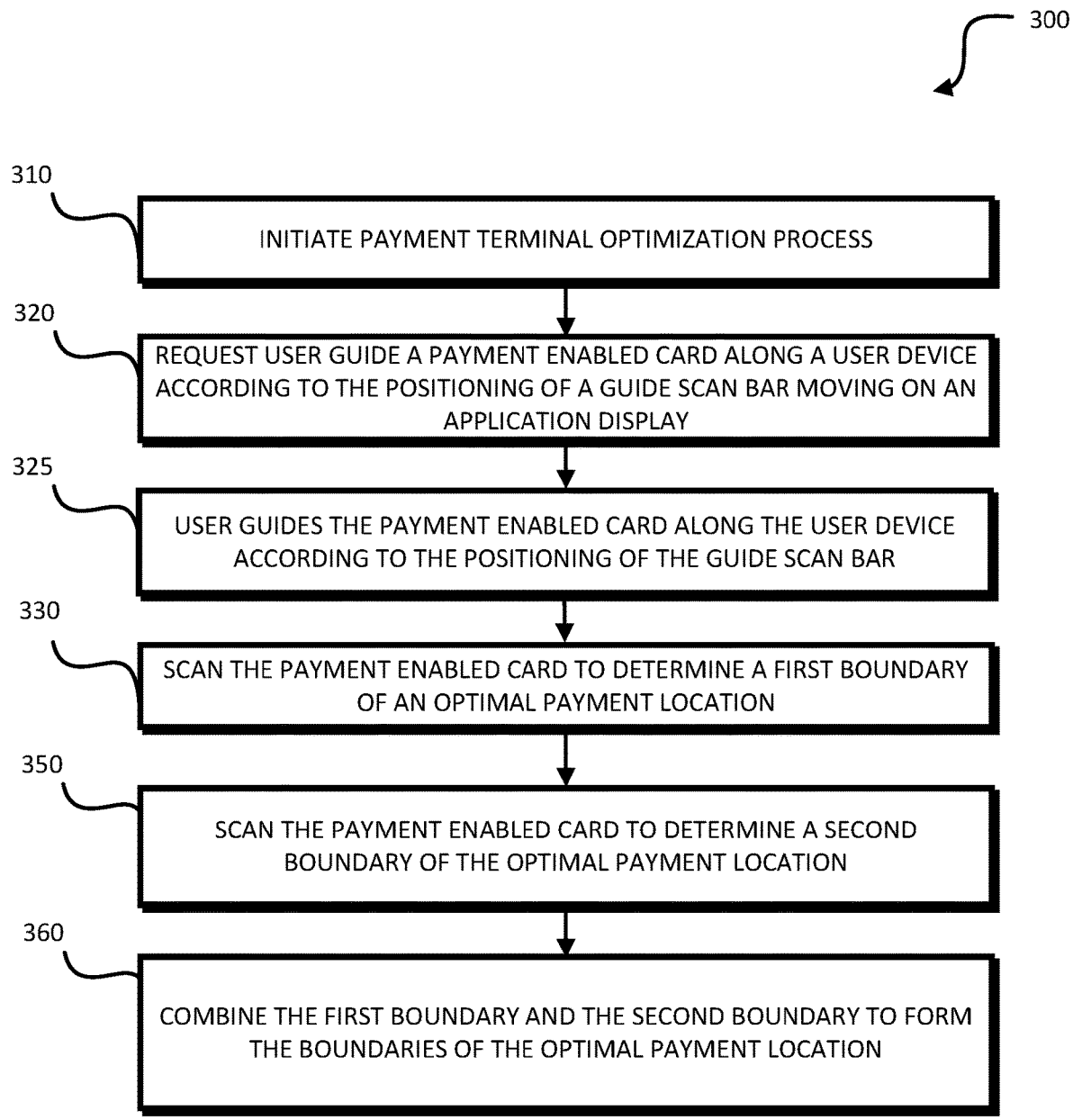
FIG. 3 is a flow diagram illustrating a method for performing payment terminal optimization techniques of FIG. 1 in accordance with some embodiments.

FIG. 3 illustrates a method for performing payment terminal optimization of FIG. 1 in accordance with some embodiments. In some embodiments, with reference to user device 110 of FIGS. 1-2, at block 310, user 105 initiates the payment terminal optimization process by selecting, for example, the begin button 207 on application display 135 of user device 110. Additionally, in some embodiments, guide scan indicator 211 is displayed on application display 135 by payment terminal optimization App 139 to assist user 105 in guiding payment enabled card 197 along a first side 262 of user device 110. In some embodiments, at block 320, payment terminal optimization App 139 requests user 105 utilize guide scan indicator 211 to guide payment enabled card 197 along the first side of user device 110 according to the positioning of the guide scan indicator 211. In some embodiments, at block 325, user 105 guides the payment enabled card 197 along the first side of user device 110 according to the positioning of the guide scan indicator 211 on application display 135. In some embodiments, user 105 guides the payment enabled card 197 in tandem with the guide scan indicator 211 along the first side of user device 110.

In some embodiments, at block 330, payment terminal optimization App 139 scans the payment enabled card 197 to determine the first boundary 212 of the optimal payment location 216. In some embodiments, at block 350, payment terminal optimization App 139 scans the payment enabled card 197 for a second response signal 174 to determine the second boundary 213 of optimal payment location 216. In some embodiments, at block 360, payment terminal optimization App 139 generates the optimal payment location 216 by combining the first boundary 212 and the second boundary 213 to form the defining edges of the optimal payment location 216. In some embodiments, payment terminal optimization App 139 subsequently displays the optimal payment location 216 on application display 135. The optimal payment location 216 displayed on application display 135 may subsequently be used by user 115 to purchase products or services from user 105 using user device 110. In some embodiments, the optimal payment location 216 may be used by similar user devices whose user device information is similar to that of user device 110, such as, for example, a similar tablet or computing device.

Figure 4A:
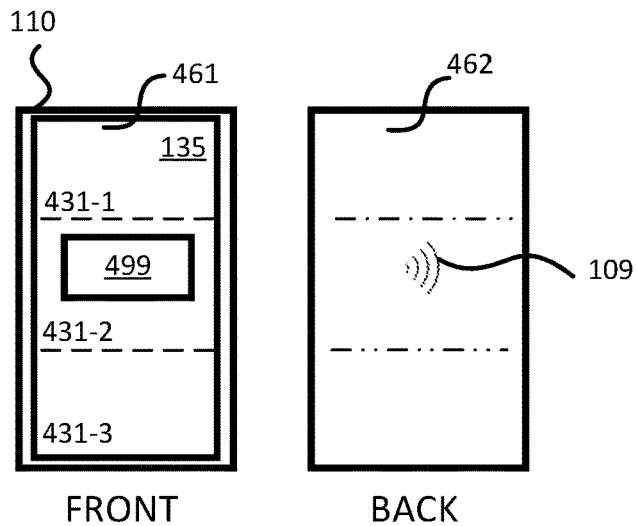
FIGS. 4A-4C illustrate a user device associated with the payment system in FIG. 1 in various stages of performing payment terminal optimization in accordance with some embodiments.
Figure 4B:
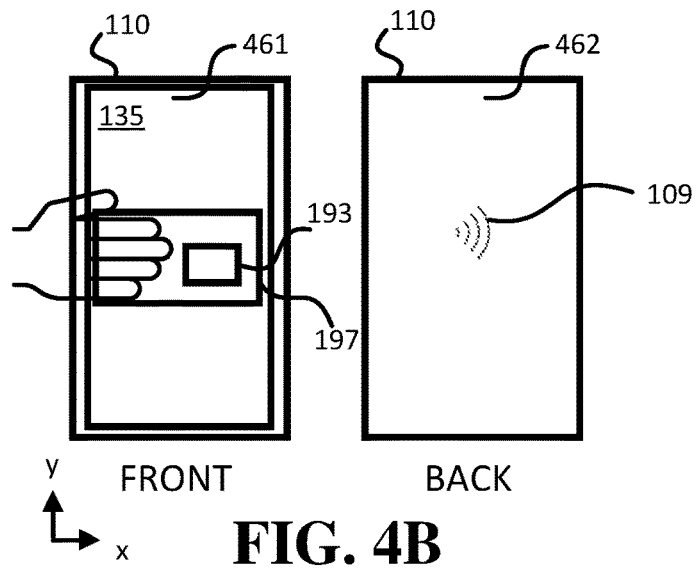
Figure 4C:
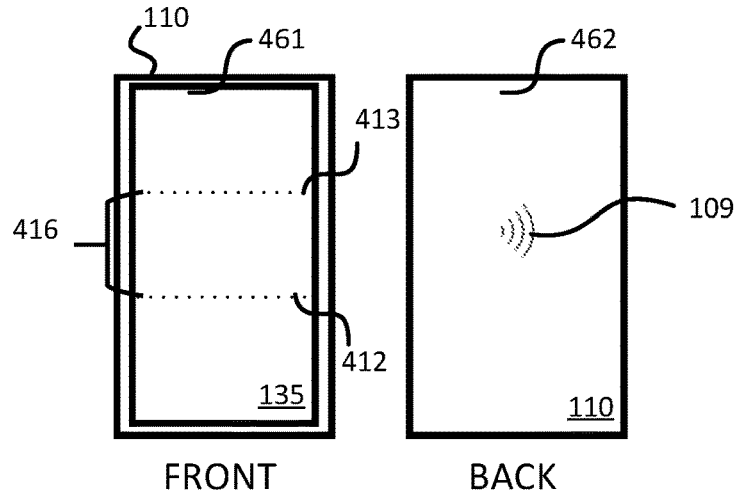

FIG. 4A-FIG. 4C illustrate various stages of a process of determining an optimal payment location 416 on application display 135 of user device 110. FIGS. 4A-4C depict a first side 462 of user device 110 illustrating a "back perspective" or a "back side" of user device 110 and a second side 461 illustrating a "front perspective" or a "front side" of user device 110. In some embodiments, application display 135 of second side 461 is partitioned by payment terminal optimization unit 177 into a first partition 431-1, a second partition 431-2, and a third partition 431-3 for purposes of determining the optimal payment location 416. In some embodiments, first partition 431-1, second partition 431-2, and third partition 431-3 are of equal width and length to allow for the positioning of a payment enabled card 197 on either the second side 461 or the first side 462. In some embodiments, first partition 431-1, second partition 431-2, and third partition 431-3 may vary in size depending on, for example, the size or location of the payment enabled device being scanned by antenna configuration 109. In some embodiments, the areas of the partitions 431 have a pre-defined length and width that correspond to, for example, the standard size of the payment enabled card 197.

In some embodiments, with reference to FIGS. 4A-4C, instead of having user 105 move payment enabled card 197 along the first side 262 of user device 110 to generate the optimal payment location 216 as depicted in FIG. 2A-FIG. 2F, payment terminal optimization App 139 requests user 105 position the payment enabled card 197 at a payment card location 431 of user device 110. In some embodiments, the payment card location 431 is a specific location on user device 110 that allows antenna configuration 109 to scan the payment enabled card 197 from a fixed location in order to generate the optimal payment location 416. In some embodiments, the payment card location 431 may be the first partition 431-1, the second partition 431-2, or the third partition 431-3 of application display 135 (depicted in detail in FIG. 4A). In some embodiments, the payment enabled card 197 is positioned by user 105 at or near the payment card location 431 on the first side 462 or second side 461 by user 105. For example, user 105 may position the payment enabled card 197 in front of the payment card location 431 (on second side 461) or in back of the payment card location 431 (on first side 462).

In some embodiments, with reference to FIG. 4A, in order to initiate the optimal payment location process, payment terminal optimization unit 177 displays a payment card image 499 (e.g., a picture or image of a payment enabled card) on application display 135 in the payment card location 431, e.g., the first partition 431-1, the second partition 431-2, or the third partition 431-3. In some embodiments, the payment card image 499 displayed on application display 135 indicates to user 105 the location to place the payment enabled card 197 for payment terminal optimization unit 177 to scan the payment enabled card 197. In some embodiments, payment terminal optimization unit 177 displays a scan payment enabled card statement in the payment card location 431 of the payment card image 499 that requests user 105 scan the payment enabled card 197 at the payment card location 431 indicated by the payment card image 499. In some embodiments, payment terminal optimization unit 177 displays a scan payment enabled card photo or illustration in the payment card location 431 of the payment card image 499 that indicates to user 105 to scan the payment enabled card 197 at the payment card location 431 indicated by the payment card image 499.

In some embodiments, user 105 holds the payment enabled card 197 behind the payment card image 499 (which corresponds to the first partition 431-1, the second partition 431-2, or third partition 431-3 selected by payment terminal optimization unit 177) to initiate the scanning of the payment enabled card 197. In some embodiments, as depicted in FIG. 4B, user 105 holds the payment enabled card 197 in front of the payment card image 499 (which corresponds to the first partition 431-1, the second partition 431-2, or third partition 431-3 selected by payment terminal optimization unit 177) to initiate the scanning of the payment enabled card 197. In some embodiments, user 105 holds the payment enabled card 197 at the designated payment card location 431 for a time duration that allows payment terminal optimization unit 177 to scan the payment enabled card 197. In some embodiments, user 105 may be notified that the time duration for holding the payment enabled card 197 has expired by an audio or visual notification, e.g., a beep, a ring, etc. In some embodiments, when a scan does not register properly at the designated payment card location 431, user 105 may proceed to scan the payment enabled card 197 manually by, for example, pressing an improper registration button. In some embodiments, the improper registration button indicates to the payment terminal optimization unit 177 that the user 105 attempted to scan payment enabled card 197 and the user device 110 did not register the scan properly. In some embodiments, by pressing the improper registration button, user 105 is progressed to another payment card location 431 to continue searching for the optimal payment location 416. In some embodiments, the payment card location 431 that failed to register the scan properly is marked by the payment terminal optimization unit 177 as a non-optimal payment location.

In some embodiments, payment terminal optimization unit 177 uses antenna configuration 109 to scan the payment enabled card 197 at the selected partition that corresponds to the payment card location 431 where user 105 is holding the payment enabled card 197, which in FIG. 4B, is the second partition 431-2. In some embodiments, payment terminal optimization unit 177 scans the payment enabled card 197 using antenna configuration 109 at the selected partition to determine whether payment terminal optimization unit 177 is able to sense payment enabled card 197. For example, in FIG. 4B, payment terminal optimization unit 177 scans the payment enabled card 197 using antenna configuration 109 at the second partition 431-2 to determine whether payment terminal optimization unit 177 is able to receive a first response signal 173 from payment enabled card 197.

In some embodiments, with reference to FIG. 4C, when payment terminal optimization unit 177 is able to sense the payment enabled card 197 by receiving the first response signal 173 from the selected partition (e.g., the first partition 431-1, the second partition 431-2, or the third partition 431-3), then the selected partition is designated as an optimal payment location 416 by payment terminal optimization unit 177. In some embodiments, when payment terminal optimization unit 177 is not able to sense the payment enabled card 197 from the selected partition, then the selected partition is designated by payment terminal optimization unit 177 as not being the optimal payment location, and payment terminal optimization unit 177 selects another partition of the remaining partitions for user 105 to place payment enabled card 197 for scanning. In some embodiments, payment terminal optimization unit 177 selects the remaining partitions until the payment terminal optimization unit 177 is able to sense the payment enabled card 197. In some embodiments, when the payment terminal optimization unit 177 is able to sense the payment enabled card 197, the corresponding partition is designated as an optimal payment location 416 for display on application display 135.

In some embodiments, a "try again" functionality may be added to the payment terminal optimization App 139 that allows user 105 to repeat the scanning process. In some embodiments, the try again functionality may be used when, for example, a user 115 accidently waves payment enabled card 197 in a location that has not been indicated by guide scan indicator.

In some embodiments, with further reference to FIG. 4A-FIG. 4C, payment terminal optimization unit 177 displays the payment card image 499 in each payment card location 431, e.g., the first partition 431-1, the second partition 431-2, and the third partition 431-3. In some embodiments, payment terminal optimization unit 177 displays the payment card image 499 randomly or sequentially. In some embodiments, user 105 holds the payment enabled card 197 in front of each payment card location 431 indicated by the payment card image 499 (which corresponds to the first partition 431-1, the second partition 431-2, and the third partition 431-3). In some embodiments, payment terminal optimization unit 177 uses antenna configuration 109 to scan the payment enabled card 197 at each payment card location 431 (e.g., the first partition 431-1, the second partition 431-2, and the third partition 431-3) indicated by the payment card image 499 and determines whether payment terminal optimization unit 177 is able sense the payment enabled card 197 from each payment card location 431. In some embodiments, when payment terminal optimization unit 177 is able to sense the payment enabled card 197 from the payment card location 431 (either 431-1, 431-2, and/or 431-3), the payment card location 431 is designated as an optimal payment location. In some embodiments, when, for example, there are a plurality of payment card locations 431 that are designated as optimal payment locations by payment terminal optimization unit 177, the plurality of optimal payment locations may be combined by payment terminal optimization unit 177 to form a master optimal payment location.

Figure 5:
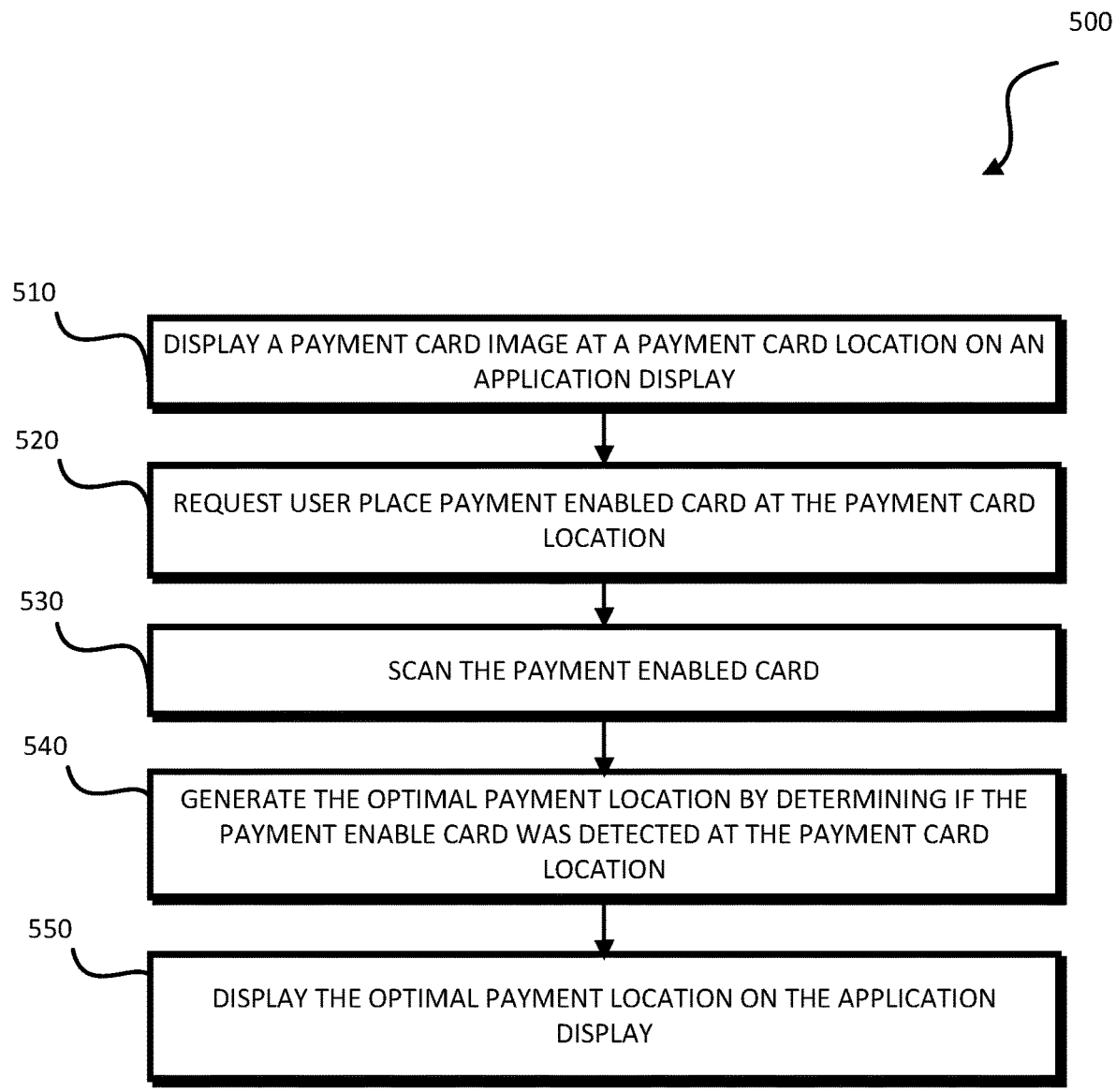
FIG. 5 is a flow diagram illustrating a method for performing payment terminal optimization techniques of FIG. 1 in accordance with some embodiments.

FIG. 5 illustrates a method 500 for performing payment terminal optimization of FIG. 1 in accordance with some embodiments. In some embodiments, with reference to user device 110 of FIG. 4A-FIG. 4C, at block 510, payment terminal optimization unit 177 displays payment card image 499 on application display 135 in the payment card location 431. In some embodiments, payment terminal optimization unit 177 displays the payment card image 499 in the first partition 431-1, the second partition 431-2, or the third partition 431-3 of application display 135.

In some embodiments, at block 520, payment terminal optimization unit 177 requests user 105 place the payment enabled card 197 on first side 462 that corresponds to the payment card location 431 indicated by the payment card image 499. In some embodiments, at block 520, payment terminal optimization unit 177 requests user 105 place the payment enabled card 197 at the payment card location 431 indicated by the payment card image 499. In some embodiments, at block 530, payment terminal optimization unit 177 utilizes antenna configuration 109 to scan for the presence of payment enabled card 197. In some embodiments, antenna configuration 109 senses or scans for the presence of payment enabled card 197 by transmitting a first scan signal 171 to payment enabled card 197 and receiving a first response signal from the payment enabled card 197 as an acknowledgement. In some embodiments, at block 540, based on a determination as to whether the payment enabled card 197 was detected during the scanning process at the payment card location 431, payment terminal optimization App 139 generates the optimal payment location 416. In some embodiments, the optimal payment location 416 is defined by a first boundary 412 and a second boundary 413. In some embodiments, at block 550, payment terminal optimization App 139 displays the optimal payment location 416 on application display 135. The optimal payment location 416 may subsequently be used by user 115 to purchase products or services from user 105 using user device 110. In some embodiments, out of, for example, three optimal payment locations, on-screen visuals generated by payment terminal optimization App 139 during payment by user 115 may indicate whether to tap the top, middle or bottom of the user device 110. In some embodiments, payment terminal optimization App 139 may indicate to user 115 to tap the top, middle, or bottom of the user device 110 based on, for example, a ranking of the optimal payment locations by payment terminal optimization unit 177. In some embodiments, providing the on-screen visuals may assist with, for example, user payment efficiencies, etc. In some embodiments, other orientations of payment enabled card 197 may be used.

In some embodiments, referring back to FIG. 1, as part of the payment terminal optimization process, payment terminal optimization App 139 performs a protective case assessment of user device 110. In some embodiments, the protective case assessment of user device 110 includes determining whether the user device 110 has a protective case and allowing payment terminal optimization App 139 to consider the protective case in determining the optimal payment location during the payment terminal optimization process. In some embodiments, a protective case is a plastic, rubber, or other type of material case that is designed to cover and protect user device 110. In some embodiments, the protective case may include other potential accessories, such as, for example, a phone skin, a protective tape, a protective wrap, a pop socket, a magnet, a docking station, etc. In some embodiments, having a protective case on user device 110 affects the optimal payment location determination by blocking signal transmission from the payment enabled card 197 to user device 110 during the payment terminal optimization process.

In some embodiments, during the protective case assessment, payment terminal optimization App 139 displays a protective case confirmation button, a non-protective case confirmation button, and a protective case query statement that queries user 105 as to whether user device 110 is utilizing a protective case. In some embodiments, the protective case may include a screen protector, docking mechanism, or other protective covering that may block signals transmitted or received by user device 110. In some embodiments, user 105 views the protective case confirmation button, the non-protective case confirmation button, and the protective case query statement and either confirms the user device 110 has the protective case by selecting the protective case confirmation button or confirms that the user device 110 does not have a protective case by selecting the non-protective case confirmation button.

In some embodiments, when user 105 selects the non-protective case confirmation button and does not confirm that there is a protective case on user device 110, payment terminal optimization App 139 exits the protective case assessment and proceeds with determining the optimal payment location as described with reference to FIG. 2A-FIG. 2F or FIG. 4A-FIG. 4C. In some embodiments, when user 105 selects the non-protective case confirmation button, payment terminal optimization App 139 displays a first no-case response to user 105. For example, the first no-case response may state that, for example, "The payment terminal verification will run under the assumption that this phone is not covered with a protective case. If you decide to put a protective case on in the future, please rerun the payment terminal verification indicating that the phone has a protective case attached." In some embodiments, after displaying the first no-case response, payment terminal optimization App 139 exits the protective case assessment and proceeds with determining the optimal payment location as described with reference to FIG. 2A-FIG. 2F or FIG. 4A-FIG. 4C.

In some embodiments, when user 105 selects the protective case confirmation button and confirms the user device 110 has a protective case, payment terminal optimization App 139 displays a first protective-case response to user 105. For example, the first protective-case response may state that "The added case covering may affect antenna performance when performing the payment terminal verification or when utilizing the user device 110 as a payment terminal". In some embodiments, after displaying the first protective-case response, payment terminal optimization App 139 exits the protective case assessment and proceeds with determining the optimal payment location as described herein.

In some embodiments, as part of the protective case assessment, payment terminal optimization App 139 may suggest to user 105 the type of protective case that may be used for user device 110 in order to refrain from blocking payment enabled card during the scanning process in order to generate the optimal payment location 216 or optimal payment location 416.

In some embodiments, as part of the protective case assessment, payment terminal optimization App 139 addresses the potential "future use" of a protective case on user device 110 by user 105. Payment terminal optimization App 139 displays a future-use protective case confirmation button, a future-use non-protective confirmation button, and a future-use protective case confirmation statement that queries user 105 as to whether user device 110 will be utilizing a protective case in the future. User 105 then selects either the future-use protective case confirmation button to confirm that a protective case will be utilized in the future or the future-use non-protective confirmation button to respond that a protective case is not going to be used in the future. In some embodiments, when user 105 selects the future-use protective case confirmation button, payment terminal optimization App 139 displays to user 105 that adding a protective case may affect antenna performance when performing the payment terminal verification or when utilizing the user device 110 as a payment terminal. In some embodiments, when user 105 selects the future-use protective case confirmation button, payment terminal optimization App 139 displays to user 105 a statement to utilize the protective case on during the payment optimization process. In some embodiments, payment terminal optimization App 139 displays to user 105 that user 105 may be prompted to remove the protective case during the payment terminal optimization process. In some embodiments, after displaying the response, payment terminal optimization App 139 exits the protective case assessment and proceeds with determining the optimal payment location as described herein.

In some embodiments, when user 105 selects the future-use non-protective confirmation button, payment terminal optimization App 139 displays a first future no-case response to user 105. For example, the first future no-case response may state that, for example, "The payment terminal verification will run under the assumption that this phone is not covered with a protective case. If you decide to put a protective case on in the future, please rerun the payment terminal verification indicating that the phone has a protective case attached." In some embodiments, after displaying the first future no-case response, payment terminal optimization App 139 exits the protective case assessment and proceeds with determining the optimal payment location as described herein.

In some embodiments, the protective case assessment by payment terminal optimization App 139 or the responses by user 105 to all queries conducted during the protective case assessment are stored in, for example, a computer readable medium associated with payment terminal optimization App 139. In some embodiments, payment terminal optimization App 139 exits the protective case assessment and proceeds with determining the optimal payment location as described herein.

In some embodiments, with reference to FIGS. 1-3, for generation of a rectangular optimal payment location, payment terminal optimization unit 177 may determine the third boundary of the optimal payment location and the fourth boundary of the optimal payment location by connecting the edges or sides of application display 135 that connect the first boundary to the second boundary (depicted in FIG. 2A-FIG. 2F). For example, in some embodiments, the third boundary and the fourth boundary are a first edge and a second edge of the optimal payment location that connect the first boundary to the second boundary. In some embodiments, payment terminal optimization unit 177 uses the first boundary, the second boundary, and the third boundary and the fourth boundary created by a first edge and a second edge of application display 135, to form the defining edges of the optimal payment location used by user 115 to pay for products from user 105 using user device 110.

In some embodiments, during the scanning processing, antenna configuration 109 is able to ascertain payment enabled device information 193 from payment enabled card 197. Payment enabled device information 193 is information that can be transferred from the payment enabled device to user device 110 via the payment enabled technology (e.g., NFC antenna configuration), such as an account number, expiration date, and/or username of the account holder associated with the payment enabled card 197.

In some embodiments, a method includes determining, at a user device, a first boundary of an optimal payment location on a display of the user device; and determining, at the user device, a second boundary of the optimal payment location of the display of the user device, wherein the first boundary and the second boundary combine to form defining edges of the optimal payment location. In some embodiments, the method includes generating, using a payment card image displayed on a partition of the display, the first boundary and the second boundary of the optimal payment location. In some embodiments, the method includes generating the first boundary of the optimal payment location by having a user of the user device guide a payment enabled card along a first side of the user device. In some embodiments of the method, in order to generate the first boundary of the optimal payment location, the payment enabled card is guided from a first location of the first side of the user device to a second location of the first side of the user device. In some embodiments, the method includes generating the second boundary of the optimal payment location by having the user of the user device guide the payment enabled card along the first side of the user device. In some embodiments of the method, in order to generate the second boundary of the optimal payment location, the payment enabled card is guided from a third location of the first side of the user device to a fourth location of the first side of the user device. In some embodiments of the method, a guide scan indicator is used to guide the payment enabled card along the user device. In some embodiments of the method, in order to guide the payment enabled card along the first side of the user device, the guide scan indicator guides the payment enabled card from a first guide scan indicator position on the display to a second guide scan indicator position on the display.

In some embodiments, a system includes a processor and a non-transitory computer readable medium coupled to the processor. The non-transitory computer readable medium includes code, that when executed by the processor, causes the processor to: receive input from a user of a user device to generate an optimal payment location on an application display; generate a first boundary of the optimal payment location on the application display of the user device based upon a first motion of a payment enabled card in a first direction; and generate a second boundary of the optimal payment location on the application display of the user device based upon a second motion of the payment enabled card in a second direction, wherein the first boundary and the second boundary combine to form defining edges of the optimal payment location. In some embodiments of the system, the first boundary of the optimal payment location is generated by having the user of the user device guide the payment enabled card along a first side of the user device. In some embodiments of the system, in order to generate the first boundary of the optimal payment location, the payment enabled card is guided from a first location of the first side of the user device to a second location of the first side of the user device. In some embodiments of the system, the second boundary of the optimal payment location is generated by having the user of the user device guide the payment enabled card along the first side of the user device. In some embodiments of the system, in order to generate the second boundary of the optimal payment location, the payment enabled card is guided from a third location of the first side of the user device to a fourth location of the first side of the user device. In some embodiments of the system, a space between the first boundary and the second boundary forms the optimal payment location. In some embodiments of the system, a guide scan indicator is used to guide the payment enabled card along the user device.

In some embodiments, a user device includes an application display and a guide scan indicator located on the application display of the user device, wherein based upon guidance of a payment enabled card by the guide scan indicator along the user device, an optimal payment location is generated on the application display. In some embodiments of the user device, the optimal payment location is determined by scanning the payment enabled card for a first response signal. In some embodiments of the user device, in order to generate a first boundary of the optimal payment location, the payment enabled card is guided in a first direction to scan for the first response signal. In some embodiments of the user device, in order to generate a second boundary of the optimal payment location, the payment enabled card is guided in a second direction to scan for a second response signal. In some embodiments of the user device, the first boundary and the second boundary combine to form defining edges of the optimal payment location.

For purposes of the description, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

What is claimed is:

1. A communication device, comprising:
an application display including a guide scan indicator;
an antenna configuration;
a processor; and
a non-transitory computer readable medium coupled to the processor, the non-transitory computer readable medium comprising code, that when executed by the processor, causes the processor to:
receive input from a user of the communication device to generate an optimal payment location of a payment enabled card on the application display;
guide, using the guide scan indicator, the payment enabled card along the communication device;
generate, using the antenna configuration, a first boundary of the optimal payment location on the application display of the communication device based upon a first motion of the payment enabled card in a first direction;
generate, using the antenna configuration, a second boundary of the optimal payment location on the application display of the communication device based upon a second motion of the payment enabled card in a second direction, wherein the first boundary and the second boundary combine to form defining edges of the optimal payment location; and
responsive to the payment enabled card being placed at the optimal payment location, use the optimal payment location to process a purchase made by the user using the payment enabled card.

2. The communication device of claim 1, wherein:
the first boundary of the optimal payment location is generated by having the user of the communication device guide the payment enabled card along a first side of the communication device.

3. The communication device of claim 2, wherein: in order to generate the first boundary of the optimal payment location, the payment enabled card is guided from a first location of the first side of the communication device to a second location of the first side of the communication device.

4. The communication device of claim 2, wherein: the second boundary of the optimal payment location is generated by having the user of the communication device guide the payment enabled card along the first side of the communication device.

5. The communication device of claim 2, wherein:
in order to generate the second boundary of the optimal payment location, the payment enabled card is guided from a third location of the first side of the communication device to a fourth location of the first side of the communication device.

6. The communication device of claim 5, wherein:
a space between the first boundary and the second boundary forms the optimal payment location.

* * * * *